May 3, 1927.
H. F. TOWNER
DISK HARROW
Filed Oct. 8, 1925
1,627,355
2 Sheets-Sheet 1
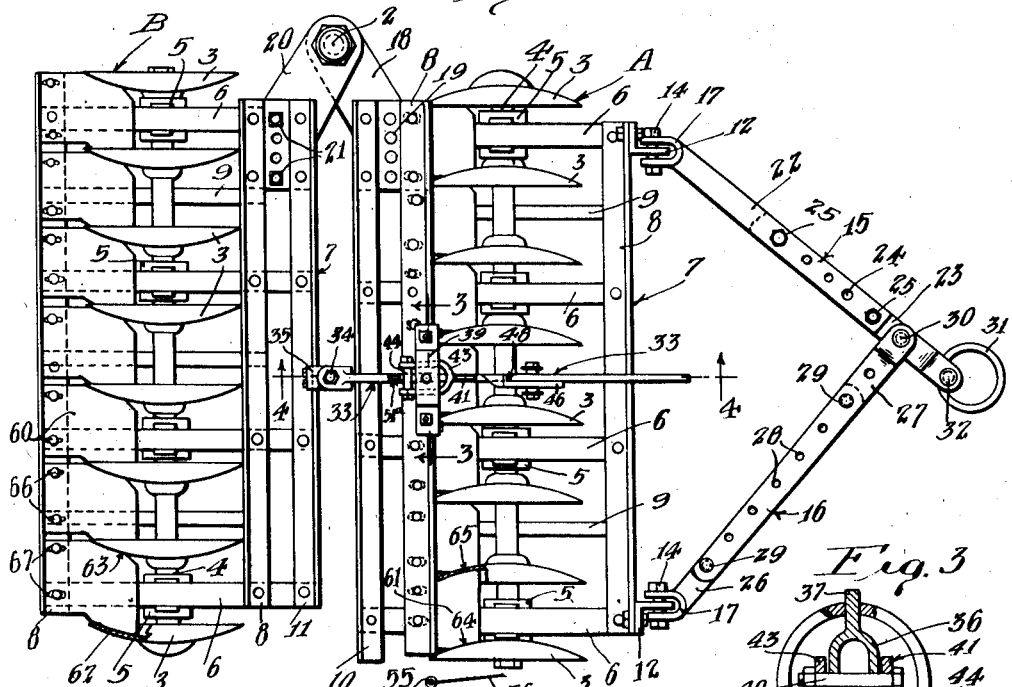
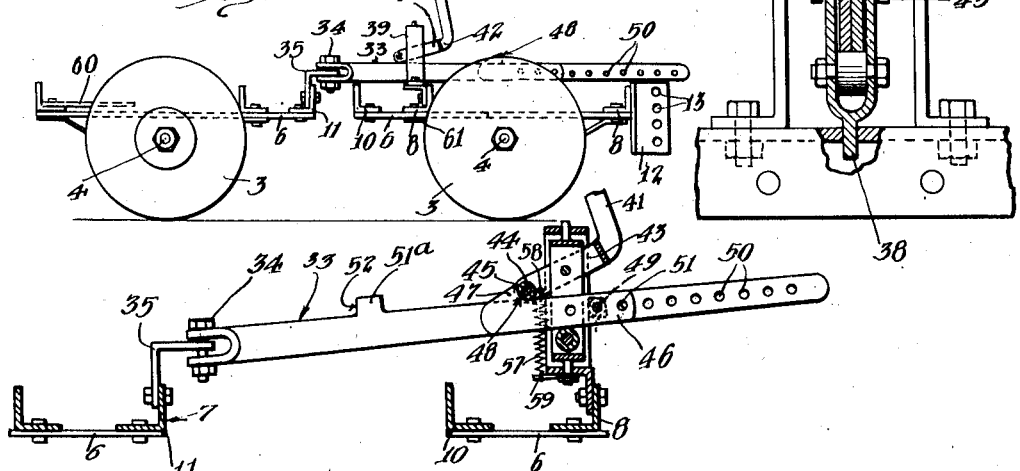
Inventor
Heber F. Towner
By Lyon & Lyon
Attorneys May 3, 1927.

H. F. TOWNER

DISK HARROW

Filed Oct. 8, 1925

Inventor
Heber F. Towner
By Lyon & Lyon
Attorneys

Patented May 3, 1927.

1,627,355

UNITED STATES PATENT OFFICE.

HEBER F. TOWNER, OF SANTA ANA, CALIFORNIA.

DISK HARROW.

Application filed October 8, 1925. Serial No. 61,193.

This invention relates to disk harrows and more particularly to an improvement over that disk harrow disclosed in my copending application, Serial No. 7868, filed February 9, 1925.

An object of this invention is to provide a disk harrow in which means are provided for backing the harrow and which means are free from the draft connections to the disk harrow.

Another object of this invention is to provide an adjustable back-up attachment for disk harrows which is connected between the forward and rearward gangs of the disk harrow to prevent the rear gang from running ahead or falling behind its adjusted working position.

Another object of this invention is to provide a disk harrow having draft means connected thereto in such a manner that the disks of the gang will be caused to work the soil to an equal depth throughout the gang.

Another object of this invention is to provide a disk harrow in which means are provided for causing a plurality of gangs of tandem disks to work the soil at different depths for the respective sets of tandem disks.

Another object of this invention is to provide a back-up attachment for disk harrows, which back-up attachment is controllable from a point distant from the disk harrow and which back-up attachment also functions as a stay-connection to prevent the running ahead or dragging of the rear gang of disks from the adjusted working position.

Another object of this invention is to provide a disk harrow having weight-boxes or containers so positioned on the frame that the disks of the tandem harrow will be forced to cut or work the soil to an equal depth.

Another object of this invention is to provide a tandem disk harrow in which the weight-box of the forward gang is formed at the rear of the frame of the forward gang and in which the weight box of the rearward gang is formed on the frame at the forward end of the rear gang.

Other objects and advantages of this invention will be apparent from the following detailed description of a preferred embodiment thereof as illustrated in the accompanying drawings, in which drawings:

Figure 1 is a top plan view of a single tandem disk harrow embodying this invention.

Figure 2 is a side elevation thereof with the draft connections removed.

Figure 3 is a front section of the back-up and stay-connection taken substantially on the line 3—3 of Figure 1.

Figure 4 is a side elevation of the back-up and stay attachment taken substantially on the line 4—4 of Figure 1.

Figures 5, 6:
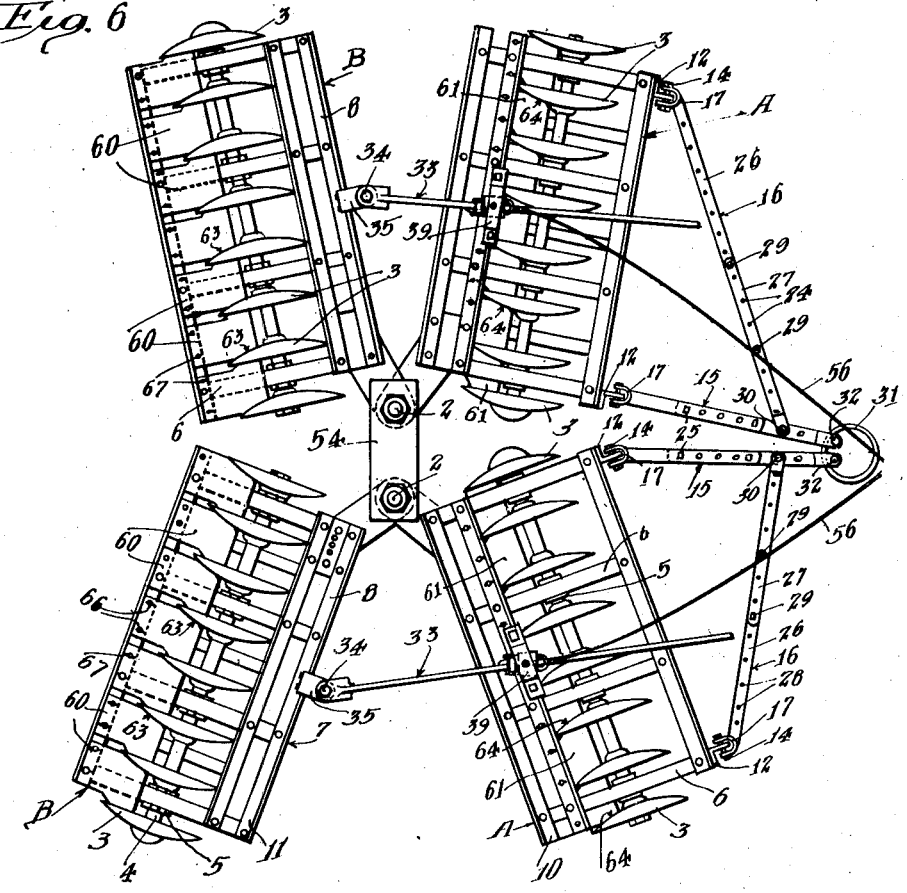
Figure 5 is a front elevation illustrating the draft connections as broken away.
Figure 6 is a top plan view of a double tandem disk harrow embodying this invention and illustrating the sets of tandem disks adjusted to different working angles.

In the preferred embodiment of this invention illustrated in the accompanying drawings, A illustrates a front gang of disks and B illustrates a rear gang of disks. The front gang of disks A is pivotally connected to the rear gang of disks B at a draft and pivot connection formed by the pin 2. The gang of disks A comprises a plurality of concavo convex disks 3 which are rigidly secured to a shaft 4 which is rotatably mounted in bearings 5 which are secured to the longitudinal member 6 of the frame 7. The longitudinal members 6 of the frames 7 are connected at their ends to front and rear frame members 8 which front and rear members 8 are likewise connected together by intermediate braces 9. The transverse members 6 are extended rearwardly from the rear members 8 and are secured to channel irons 10 which form a weight-box at the rear of the gang of disks A. The rear gang of disks B is similar to the forward gang of disks A except that the longitudinal members 6 of the rear gang are extended forwardly and connected at their forward ends to a channel iron 11 so that the weight-box of the rear gang of disks B is formed at the front of the gang of disks B. This forming of the weight-box in the front of the gang B so that the same may receive any desirable weights prevents the front gang B from raising at its forward end from the ground so that the same does not work as much soil as is worked by the forward gang A which tendency is very marked in disk gangs as now constructed, that is, the rear gang of the tandem disks tends to ride on the surface of the ground as the same is worked by the front gang.

In order to maintain the gangs of disks in equal working relation with the soil throughout the length of the gangs, the following preferred draft connection is provided.

Secured at or near the ends of the forward member 8 are vertically extended brackets 12, which brackets 12 have formed therein a plurality of holes or perforations 13, any one of which perforations 13 is adapted to receive a bolt 14 so as to adjustably connect the disk harrow with the adjustable draft-bars 15 and 16. The bolts 14 pass through eyes formed in the forked ends 17 of the draft-bars 15 and 16. The draft connection 15, which is connected to the end of the disk harrow corresponding to that at which the gangs A and B are pivotally connected at the pivot pin 2, is preferably made by the bolt 14 at the lower pin of bracket 12 while the draft connection made by the bar 16 at the opposite corner of the disk harrow is preferably above the draft connection made at the former corner. This connecting of the draft bars 15 and 16 to different levels causes the end of the disk harrow, which is connected with the draft-bar 16, to be held down against the tendency of the soil to draw the disks 3 at this end out of the soil as the soil pushes against the concave sides of the disks 3. The pivot pin 2 through which the gangs A and B are connected in driving and driven relations is located on or near the bisector of the angle formed between the axes of the gangs A and B when the same are angled to a working position as illustrated in Figure 6. The pivot point 2 is also preferably located near or beyond the end of the end disks 3 of the gangs A and B when the same are in the parallel position as illustrated in Figure 1. The gang A is pivotally connected to the gang B and the pin 2 by means of a plate 18 which is connected to the frame 7 of the gang A as illustrated at 19 and by a bifurcated bracket 20 which is secured to the frame 7 of the gang B as illustrated at 21. The bifurcated bracket 20 is constructed of two flat plates between which the plate 18 fits so that a vertically rigid connection is formed between the gangs A and B so that the said gangs will be rigidly connected in a vertical plane but will be permitted to pivot in a horizontal plane.

The draft-bar 15 comprises a pair of steel bars 22 and 23 which are adjustably connected through perforations 24 by bolts 25. The draft-bar 16 likewise comprises a pair of bars 26 and 27 which are adjustably connected at perforations 28 by bolts 29. The draft-bar 16 is pivotally connected to the bar 23 at the pin 30. A draft-ring 31 is secured to the forward end of the draft-bar 15 as illustrated at 32. By adjusting the draft-bars 15 and 16 to different lengths and by adjusting the position of the pin 30 the angle at which the disks 3 work the soil is adjusted. The adjusting of the working angle of the disks 3 of the forward gang A is transmitted through the pivot connection formed in the pin 2 to the rearward gang B so that the disks 3 of the rearward gang B automatically assume a like or corresponding working angle.

In order to permit the backing of this disk harrow and for the purpose of providing a stay-connection between the gangs A and B to prevent the rear gang of disks from running ahead of its adjusted position or dragging behind the adjusted position when the same encounters a greater or lesser distance to travel than is presented by the soil to the disks 3 of the forward gangs, a stay-bar 33 is provided which is adjustably connected at the clevis-pin 34 through a bracket 35 to the channel iron 11 of the rearward frame. This stay-bar 33 passes through a bifurcated bracket 36 which is pivotally supported at the extensions 37 and 38 in the bracket 39 and to the rear member 8 of the forward frame 7. Pivotally supported at a pin 40 which passes through the bifurcated bracket 36 is a control lever 41 which is angled at 42. The control-lever 41 has a fork 43 formed at its lower end, in which fork 43 a roller 44 is supported on a pin 45. Secured to the stay-bar 33 is a plate 46 which has an abutment 47 formed thereon which extends above the upper level of the stay-bar 33 and presents a shoulder 48 against which the roller 44 is engaged when the disks 3 of the gangs A and B are angled to their proper working position so as to prevent the rear gang B from running ahead of its adjusted position due to the encountering, by the rear gang of the disks 3, of a lesser resistance to travel than is encountered by the disks 3 of the forward gang A, which condition is found to exist in one instance when the disk harrow is employed for cultivating transversely across slopes or inclines. The plate 46 is adjustably secured to the stay-bar 33 at a bolt 49 which may be positioned in any one of the perforations 50 or 51 formed in the stay-bar 33 and plate 46 respectively. In order to permit the backing of the disk harrow when the gangs A and B are in the parallel position a shoulder 51ᵃ is formed on the stay-bar 33 in position to engage the roller 44 so that the backing of the rear gang B may be had through the stay-bar 33 and pin 2. The opposite shoulder 52 of the abutment 51ᵃ which is formed on the stay-bar 33 is engaged by the roller 44 ahead of the roller 44 when it is desired to draw the disk harrow over the soil without working the same, that is, when it is desired to transport the disk harrow from one position or place to another.

In Figure 6, two single tandem disks formed by gangs A and B as heretofore described are connected together by a plate 54 and angled to two different working angles which is often desired of a double tandem disk harrow when working among trees in an orchard to a greater depth than the opposite set of gangs of disks in cultivating between the rows of trees.

Secured to the upper end of the control-arm 41 in the eye 55 is a control-rope 56 which extends forward from the disk harrow preferably to a point within easy reach of the driver of the tractor or draft implement by means of which the disk harrow is being drawn over the ground.

A spring 57 is connected at one end 58 to the fork 43 of the operating-arm 41 and at its opposite end 59 to the member 8 of the frame 7 so as to yieldably urge the roller 44 in position to be engaged by the shoulder 48 or the shoulders 51ª or 52.

In order to clean the disks 3 a plurality of scrapers 60 and 61 are provided, each of which scrapers 60 and 61 are provided with 2 scraping edges 62, 63, 64, and 65 respectively. The scrapers 60 and 61 are adjustably secured to the frame member 8 and bolts 66 which pass through the slots 67 formed in the scrapers. The scrapers 60 and 61 will therefore obviously clean both sides of the disks 3 and being adjustably mounted they may be moved into engagement with the respective sides of the disks 3 as they wear.

Having fully described a preferred embodiment of my invention, it is to be understood that I do not wish to be limited to the exact details herein set forth which may obviously be varied without departing from the spirit of my invention as set forth in the appended claims.

I claim—

1. A disk harrow comprising two gangs only in tandem relation, a rigid draft connection between the forward gang and the rear gang, the two gangs being held against relative vertical movement, a pair of draft connections, means for connecting the said draft connections to the forward gangs near the ends thereof at different levels.

2. A disk harrow comprising a pair of frames connected in tandem relation, a plurality of concave disks mounted in the front frame with their concave sides all turned toward one end of the frame, a plurality of concave disks mounted in the rear frame with their concave sides turned opposite to the concave sides of the front disks, a pair of draft connections, and means for connecting the draft connections to the forward frame near the ends thereof, the draft connection at the end toward which the concave sides of the disks of the forward gangs face being connected to the said forward frame at a higher level than that point at which the draft connection to the opposite end of the said frame is connected.

3. A disk harrow comprising two frames only connected in tandem relation, a plurality of concave disks mounted in the front frame with their concave sides turned toward one end of the frame, a plurality of concave disks mounted in the rear frame with their concave sides turned in the opposite direction to that in which the concave sides of the disks in the front frame are turned, a pair of draft connections connected near each end of the forward frame and vertically adjustable means for adjusting the point at which the respective draft connections are connected to the front frame.

4. A disk harrow comprising two frames only in tandem relation, a plurality of concave disks mounted in the front frame with their concave sides turned toward one end of the frame, a plurality of concave disks mounted in the rear frame with their concave sides turned in the opposite direction to that in which the concave sides of the disks in the front frame are turned, a draft connection between the front frame and the rear frame including a bifurcated bracket and a plate, and a single pin horizontally pivotally connecting said bracket and plate, said pin being situated at a point substantially midway between the axes of the disks of the front and rear frames, a pair of draft connections, means for adjusting the length of each of the latter draft connections, and vertically adjustable means for connecting the said latter draft connections to the front frame near the respective ends of the front frame.

5. In a disk harrow, the combination of two pairs of gangs of disks each comprising two gangs only in tandem relation, a single pivotal draft connection between the gangs of each pair, means connecting the pivot points of the said draft connections, a separate stay and back-up connection between the frames of each of said pairs, and a pair of draft connections connected to the forward end of each front gang and separately adjustable to independently adjust the working position of each pair of gangs.

Signed at Santa Ana, this 28th day of September, 1925.

HEBER F. TOWNER.